United States Patent [19]

Ashworth

[11] 4,289,352

[45] Sep. 15, 1981

[54] SHOULDER HEIGHT ADJUSTER FOR SEAT BELT SYSTEMS

[75] Inventor: Roger A. Ashworth, Thursby, England

[73] Assignee: Kangol Magnet Limited, Carlisle, England

[21] Appl. No.: 14,028

[22] Filed: Feb. 22, 1979

[30] Foreign Application Priority Data

May 26, 1978 [GB] United Kingdom ............... 23047/78

[51] Int. Cl.³ ........................ A62B 35/00; A47C 31/00
[52] U.S. Cl. .................................. 297/473; 24/68 SB; 280/808; 297/468; 297/483
[58] Field of Search ............... 297/483, 484, 485, 473, 297/474, 475, 468; 24/230 AK, 115 H, 68 SB, 68 CD; 280/801, 808

[56] References Cited

U.S. PATENT DOCUMENTS

| | | | |
|---|---|---|---|
| 2,685,331 | 8/1954 | Gauntlett et al. | 297/473 |
| 2,833,343 | 5/1958 | Benson | 297/473 |
| 3,028,200 | 4/1962 | Dye | 297/484 |
| 3,128,106 | 4/1964 | Zinkel, Jr. | 24/68 CD |
| 3,574,246 | 4/1971 | Norton et al. | 24/68 CD |
| 3,574,342 | 4/1971 | Berns | 24/68 CD |
| 3,860,261 | 1/1975 | Takada | 297/483 |
| 3,860,998 | 1/1975 | Schnurmacher | 24/68 SB |
| 3,929,351 | 12/1975 | Fricko | 297/483 |

FOREIGN PATENT DOCUMENTS

| | | | |
|---|---|---|---|
| 489040 | 11/1976 | Australia | 297/483 |
| 503534 | 6/1954 | Canada | 24/68 SB |
| 2323791 | 11/1973 | Fed. Rep. of Germany | 297/483 |
| 2342083 | 9/1977 | France | 297/483 |
| 1239709 | 7/1971 | United Kingdom . | |
| 1367248 | 9/1974 | United Kingdom . | |
| 1426584 | 3/1976 | United Kingdom . | |
| 1486974 | 9/1977 | United Kingdom . | |
| 1490519 | 11/1977 | United Kingdom | 297/483 |
| 1497397 | 1/1978 | United Kingdom . | |
| 1497773 | 1/1978 | United Kingdom . | |
| 1503271 | 3/1978 | United Kingdom . | |
| 1509297 | 5/1978 | United Kingdom . | |
| 1542364 | 3/1979 | United Kingdom . | |

*Primary Examiner*—James T. McCall
*Attorney, Agent, or Firm*—Young & Thompson

[57] ABSTRACT

Means are disclosed for adjusting the effective position from which the shoulder or diagonal belt of a vehicle seat belt system downwardly extends. A strap is secured to extend around the seat back portion in an upright direction and slidably carries a connector to which the belt can be connected. Alternatively the upper part of the seat back portion is clamped between limbs of a U-shaped member, the front limb mounting a connector for the belt, preferably a position which can be selectively adjusted. A third embodiment comprises a strap arranged to extend upright adjacent the seat as on a door pillar, a connector for the belt being slidable along the strap. Where the system includes a running loop for guiding the belt from a retractor, one end of the strap with the connection can be connected to a second loop secured to the running loop or both loops can be mounted for swivelling independently.

15 Claims, 7 Drawing Figures

SHOULDER HEIGHT ADJUSTER FOR SEAT BELT SYSTEMS

DESCRIPTION

The invention relates to vehicle seat belt arrangements and in particular to vehicle seat belt systems having a diagonal belt element.

Many seat belt systems include a belt element arranged to extend in use diagonally across the torso of the occupant of a seat with which the system is associated. Such a diagonal or shoulder belt element is frequently continued from a securement position at its lower end, which position may be constituted by a manually releasable buckle, across the users lap, to another securement position or anchorage on the other side so that the system constitutes a three-point or lap and diagonal system.

The diagonal belt element normally extends downwardly from a fixed position constituted by an anchorage or securement position, or by a retractor, for example an emergency locking retractor, in which the unused length of its upper end is stored. This fixed position has to be chosen so as to be appropriate to the tallest persons within the normal range and is consequently located above the shoulders of shorter persons, or children of sizes intermediate between those of infants and adults, by an inconvenient amount.

An earlier proposal for dealing with this problem is disclosed in British Pat. No. 1,367,248. According to this proposal, a seat belt support of metal plate construction is slidable in a vertical metal channel mounting secured to the vehicle door frame, the support being spring urged to engage rivets projecting therefrom into slots provided within the mounting, to releasably secure the support at a selected height. The belt can be directly secured to the support in a static system or slidably anchored in the support where the belt comes from an inertia reel. This proposal has the disadvantage of requiring a considerable structure for its realisation so that it cannot in practice be added to an existing vehicle. Moreover, the vertical position of the support cannot be infinitely adjusted but must be selected from preset possibilities. The securement of the mounting on the vehicle door severely limits the seat belt configurations with which it can be employed and there is no possibility of moving the support backwards or forwards in the vehicle to accommodate corresponding adjustment of the associated vehicle seat.

It is thus an object of the present invention to provide for the adjustment of the upper connection position of a diagonal belt element of a seat belt system by means which are simple to manufacture and to use and which can readily be added to a vehicle to which the system is already fitted.

It is also an object of the present invention to provide an adjustment device for the effective shoulder position of a diagonal seat belt element in a vehicle seat belt system which can be mounted in the vehicle at a selected position laterally of the seat back. It is a further object of the present invention to provide a shoulder height adjustment device for the diagonal belt portion of a seat belt system which can be attached to the seat of the vehicle with which the system is associated.

The invention accordingly provides guide or adjustment means for a shoulder or diagonal belt or the belt portion of a vehicle seat belt system, the guide means being secured or adapted to be secured to the back portion of the seat with which the seat belt system is associated. The guide means can be clamped to the seat back portion or extend in a loop therearound.

The invention also provides guide or adjustment means for a shoulder or diagonal belt or belt element in a vehicle seat belt system which is located adjacent the seat on the side thereof at which is located a fixed position from which the belt downwardly extends. Such adjustment means can comprise a strap for example extending along a door pillar of a vehicle door adjacent the seat.

The diagonal belt portion can preferably be connected to the adjustment means selectively, and at a selected position thereon. The adjuster means may thus be constituted by a range or plurality of connection positions fixedly located on the front surface of the back portion of the user's seat, towards the top thereof on the side from which the belt position downwardly extends, or separate from said seat at this side.

The invention will be readily understood from the following illustrative description and from the accompanying drawings, in which.

Figure 1:
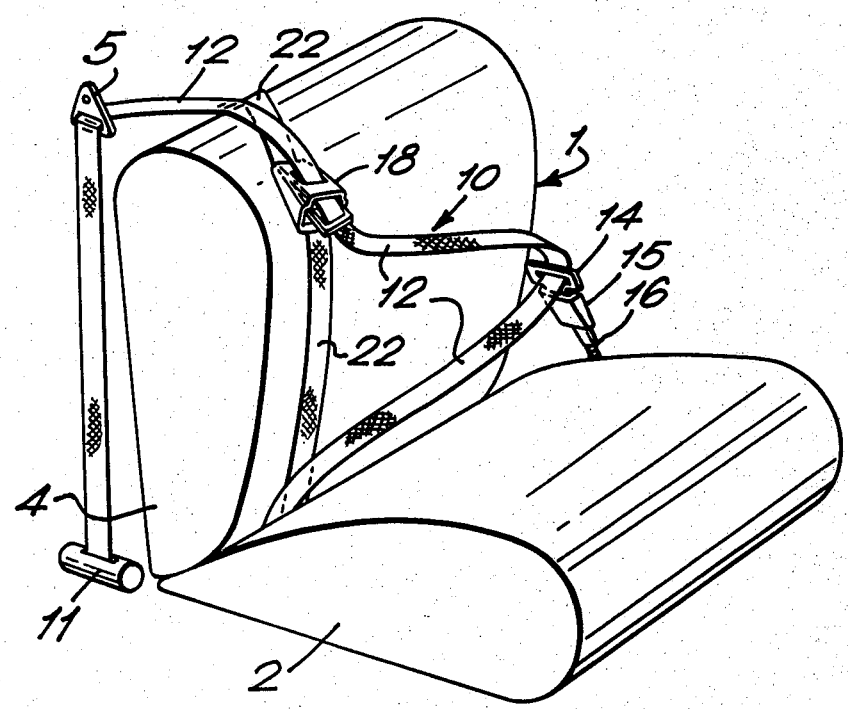
FIG. 1 is a perspective view of a vehicle seat fitted with a seat belt system including a shoulder height adjustment device in accordance with the invention.

FIG. 1 somewhat schematically shows a seat 1 which may be the driver's seat or a front or rear passenger's seat of a private motor vehicle. The seat 1 comprises a seat portion 2 and a squab or back portion 4. For use by an occupant of the seat there is provided a 3-point safety belt system comprising a retractor 11 incorporating a belt and/or vehicle sensitive locking mechanism, secured to a first anchorage at the foot of a door pillar (not shown) adjacent the seat. A belt 12 extends upwardly from the retractor to a guide loop 5 fixed on the pillar at a position above the shoulder of an occupant of the seat of normal size.

The belt 12 can be withdrawn for use from the retractor 11 against the pull of a rewind spring within the retractor.

The belt 12 extends in use from the guide loop 5 diagonally downwards to a tongue 15 of a releasable two-part buckle and through an aperture in the tongue back across the seat to an anchor bracket (not shown) to which the free end of the belt 12 is secured. The bracket itself is permanently secured to an anchorage at the right hand side of the seating so as to be to the right of the user of the seat belt system. To the left of the user, the tongue 14 is releasably connected in use with a socket member 15 of the buckle which is secured to another anchorage by means of a short length of belt, or by a bracket, or as shown by a non-resilient wire 16. The belt in use thus has a diagonal or shoulder portion between the guide loop 5 and the tongue 14, and a lap or pelvis portion between the tongue 14 and the right hand anchorage.

When out of use, the tongue 14 is disconnected from the buckle socket member 15 and the retractor 11 pulls the belt 12 so that it extends directly between the guide loop 5 and the anchorage 16. An occupant of the seat 1 will place himself between the belt 12 and the buckle member 15 and will move the tongue 14 across him to assemble it with the member 15 so that the belt 12 forms the lap and diagonal portions.

It will be seen that the upper end of the diagonal portion of the belt 12 is defined by the portion of the guide loop 5. This is appropriate to normal adult shoulder heights but not to lesser shoulder heights for example those of children. In accordance with the invention therefore means is provided whereby the effective position of the upper end of the shoulder portion can be selectively adjusted. In FIG. 1, this means is constituted by an adjustment device comprising a strap 22 which may but need not be of the same material as the belt 12.

Figure 2:
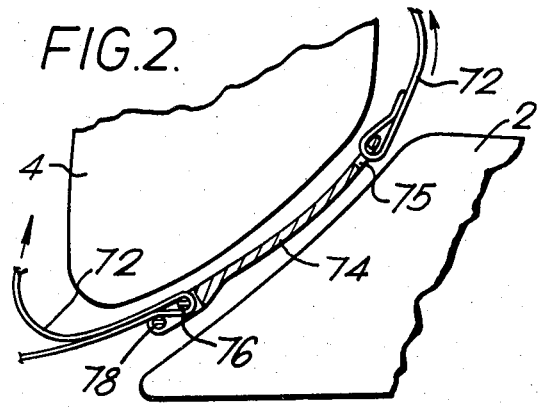
FIG. 2 is a sectional side view of a detail of the shoulder height adjustment device of FIG. 1.

The strap 22 extends right around the seat back or squab portion 4, its ends being connected together by means permitting adjustment of the strap length. Thus, as shown in FIG. 2, a rigid metal or plastics bracket 74 is received between the seat and squab portions 2, 4, and one end of the strap 22 is permanently secured to the bracket through a slot 75 formed at its forward, upper, end. The strap 22 extends upwardly over the front of the squab portion 4 and returns downwardly at the back to the lower end of the bracket 74. The connection of the strap 22 to the lower end of the bracket 74 is by means of an adjustment mechanism, as the strap is required to be tight over the seat back.

One suitable form of adjustment mechanism comprises as shown a spindle 76 around which the strap is wound and which is received in slots in the bracket so that a pull on the free end of the strap 22 engages the strap against a snubber roller 78 so that further movement of the belt is opposed. The mechanism also permits the strap 22 to be adapted to different vehicles and/or connection positions.

A connector 18 is slidable along the strap 22 and the belt 12 also extends through it. The connector is shown as being of a kind disclosed in U.S. Pat. No. 4,243,266, of Jan. 6, 1981 which Application is hereby incorporated herein by reference. Alternatively the connector can comprise a four-bar link of one of the kinds disclosed in U.S. Pat. No. 4,236,755, of Dec. 2, 1980, also incorporated herein by reference.

The adjustment device of FIGS. 1 and 2 can thus be readily installed in a vehicle by slipping the bracket 74 between the seat and squab portions 2, 4 with the free end of the strap 22 detached. The strap is then trained around the squab portion 4 and its free end secured to the bracket 74 by means of the adjustment mechanism under a tension selected so that the strap is firmly held in place. The length adjustment mechanism has to be positioned in use where it cannot be inadvertently released and the bracket 74 is shaped so that the mechanism can be received between the seat and back portions, away from the feet of occupants of a rear seat, before the strap 2 is finally tightened.

The bracket can take a simpler form than that described and can be constituted by a buckle capable of allowing the strap ends to be securely connected together with a desired tension in the strap.

In use, the connector 18 is moved along the strap 22 until it is at a height just above the shoulder of the occupant. The connector then provides the position from which the effective length of the diagonal portion of the seat belt 12 extends, this position being selectively adjustable along the length of the auxiliary belt 22 to suit the occupant. Whatever the position of the connector 18 along the strap 22, the connector allows the seat belt 12 to be readily withdrawn from the retractor 11. The shoulder height adjustment means can be taken out of use simply by unthreading the belt 12 from the connector where this is of a form to allow such separation, or by sliding the connector along the strap 22 upwardly.

Figure 3:
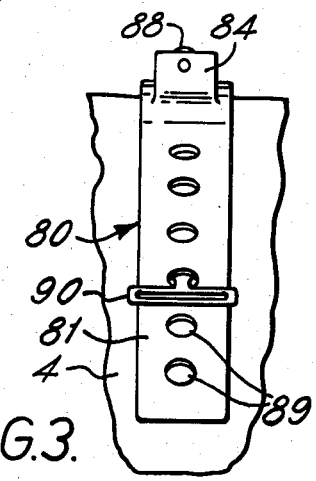
FIGS. 3 and 4 are front and side views respectively of another form of shoulder height adjustment device.
Figure 4:
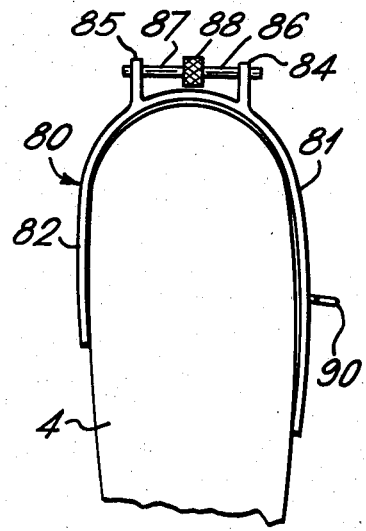

The adjustment device 80 shown in FIGS. 3 and 4 comprises a generally strip-like element formed into the shape of an inverted U so as to straddle the upper part of the squab portion 4 of the vehicle seat 1 and to clamp this portion between its front and rear limbs 81, 82. In a simple modification, this may be done by arranging the limbs of the device to be resiliently urged together but a positive clamping means is preferably provided as shown. The front and rear limbs 81, 82 are associated with respective integral upstanding lugs or flanges 84, 85 provided with tapped aligned holes in which are received respective stub shafts, 86, 87 of a turn-buckle having a central wheel portion 88 which is ridged, knurled or otherwise roughened on its outer surface so that it can be readily rotated. The stub shafts 86, 87 and the associated tapped holes are threaded in opposed senses so that the rotation of the turnbuckle in one direction urges the flanges 84, 85 apart, so causing the limbs 81, 82 to clampingly engage the squab portion between them.

Alternatively, the limbs of the device are separately constructed and hinged together or slidingly engage each other at the top of the seat squab portion so that they can be drawn together, as by a turnbuckle device, to effect clamping of the device to the seat portion 4.

However the clamping may be effected, the front limb 81 of the device provides a range of positions at which the seat belt 12 can be connected. Thus, a plurality of openings 89 are provided in the limb 81 at vertically spaced positions, for the reception of out-turned end portions of a resilient wire member forming a guide loop 90 for receiving therethrough the seat belt 12, so that the position of the guide loop defines the effective upper end of the belt. The limb 81 can carry instead other means for receiving the belt 12 at a selected height position along the limb, for example, the limb can carry a length of strap or belt with a free portion between its ends on which can slide a connector of a kind previously described to allow positioning of the connector anywhere within an available range rather than at discrete positions.

It will be evident that the device 80 can be incorporated in the seat back structure as an original fitting, the rear limb 82 and clamping arrangements then being redundant.

The adjustment device 80, like the strap 22, can be positioned at any selected position laterally of the seat back portion 4, and can readily be modified to provide for lateral as well as vertical adjustment of the position of connection with the seat belt 12, as by the provision of a second upright row of the openings 89 by the side of the row shown.

Figure 5:
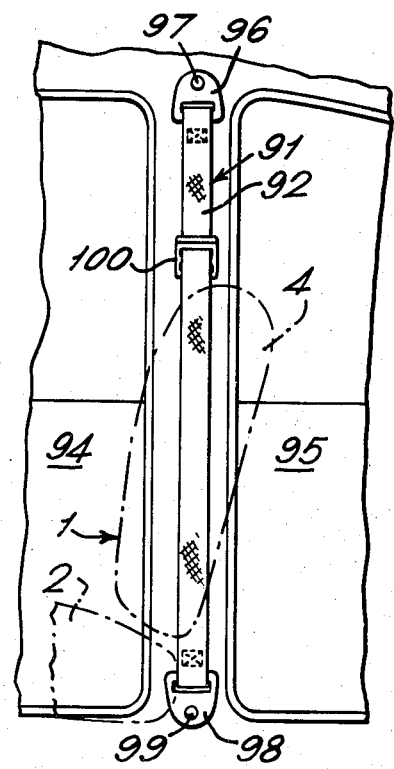
FIG. 5 is a partial internal side view of a vehicle showing yet another form of shoulder height adjustment device.

The adjustment device 91 shown in FIG. 5 provides a generally vertical range of adjustment of the shoulder height of the belt 12 at a position spaced laterally from the seat 1. The adjustment device 91 comprises a strap 92 and attachment means whereby the strap can be positioned to extend upright within the vehicle adjacent the front seat 1, specifically along the pillar between the vehicle front door 94 and rear door 95. The upper end of the strap 92 is secured to a bracket 96 connected to an upper anchorage 97 and the lower end is secured to a bracket 98 connected to a lower amchorage 99. The strap 92 and brackets can be of the same kind as used in the static seat belt system (not shown) with which the device 91 is particularly suitable for use. A length adjustment means for the strap 92 of any suitable kind is provided for example at the lower bracket 98. A connector 100 which can correspond to one of the connectors described in connection with FIGS. 1 and 2 can receive the seat belt and is slidable along the strap 92 to allow the effective shoulder height position of the belt to be selected.

Figure 6:
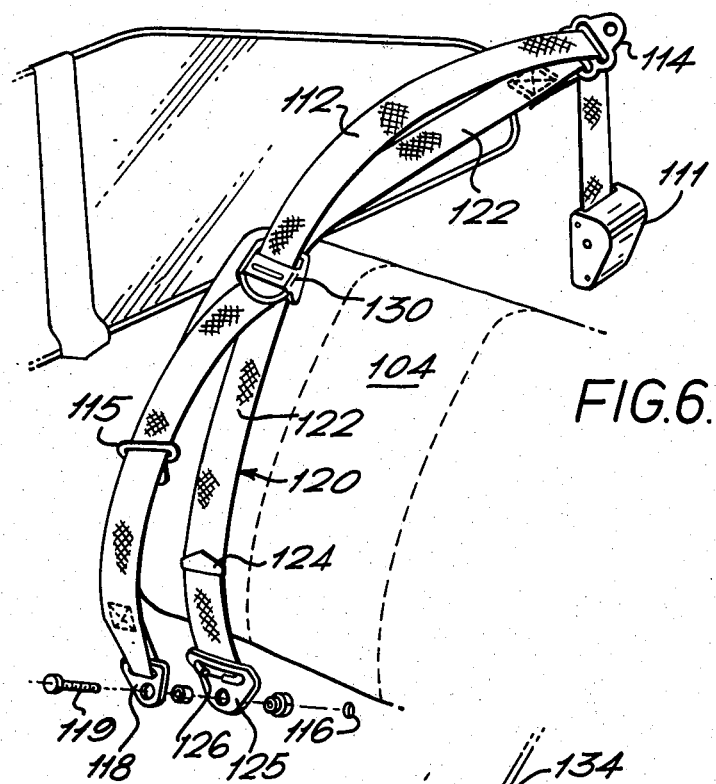
FIG. 6 is a partial internal view towards the rear of a vehicle fitted with a further shoulder height adjustment device.

In the seat belt system illustrated in FIG. 6, a seat belt 112 can be withdrawn for use from a retractor 111 mounted rearwardly of the associated seat through a running loop provided by a bracket 114 located on the vehicle side wall above the retractor. It will be noted that the bracket 114 provides a double loop, for a purpose to be described. The belt 112 extends over the front of the seat back 104, through a buckle tongue part 115 releasably connectible to a socket part of the buckle (not shown), to an anchorage 116. The anchorage 116 is located for example on the vehicle floor so that the belt 112 extends downwardly between the seat and back portions.

The shoulder height adjustment device 120 associated with this seat belt system comprises a strap 122 secured at its upper end to the outer loop of the bracket 114 and at its lower end to the anchorage 116. At this lower end, provision is made for length adjustment of the strap 122. The strap is looped back on itself, the free end being secured to a member 124 slidable on the strap and the doubled end being received through a slot in a bracket 125. A bar 126 is received through the looped end to present this from being pulled through the slot, and is retained by having its own ends turned round and over the looped end. The lower end of the belt 112 is secured to a bracket 118 and this bracket and the bracket 125 are connected together to the anchorage 116 by a single bolt 119 and appropriate spacing washers.

The strap 112 can thus be arranged to be stretched over the front surface of the seat back 104 to provide a means to which the length of the belt 112 forming the shoulder portion of the seat belt system can be connected at a desired position. This connection is effected by any suitable connector 130 preferably a connector which corresponds to one of the connectors described in connection with FIGS. 1 and 2.

Figure 7:
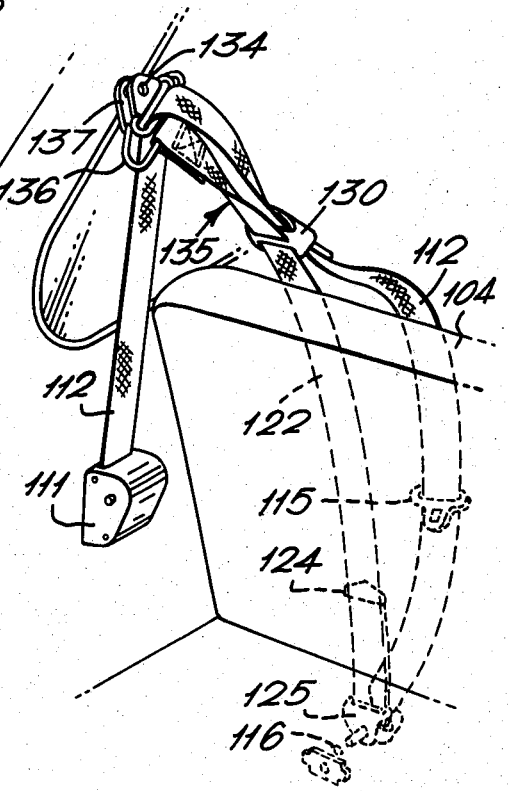
FIG. 7 is a partial internal view from the rear of a vehicle fitted with yet another shoulder height adjustment device.

The seat belt system of FIG. 7 and the shoulder height adjustment device 135 included in it correspond generally to those of FIG. 11 and like parts are given the reference numerals used in the FIG. 6 system accordingly. Instead however of the running loop provided by the bracket 114, the belt 112 extends from the retractor through a running loop provided by a bracket 134 which can swivel about the axis of a fastening by which it is connected to an anchorage in the vehicle side wall. The swivelling of the bracket 134 accommodates movement of the belt 112 between its in use and out of use positions, due to the particular location of the system in the vehicle in this instance.

So that the strap 122 can take up and retain the desired position thereof taut over the front surface of the seat back 104, the upper end of the strap is secured to a separate secondary loop 136, provided by a bracket 137, which is of greater size than the loop provided by the bracket 134. The bracket 137 is mounted together with the bracket 134 and so that it can swivel to an appropriate position independently of the swivelling movement of the bracket 134. As before, the connector 130 provides a slidable connection between the belt 112 and the strap 122 at a selected position along the latter to allow adjustment of the effective shoulder height positions of the belt.

The arrangements of FIGS. 6 and 7 can be employed where a running loop is fitted and it is inconvenient to anchor the upper end of the strap 112 to the floor or in the trunk. It will be evident that the lower end of the strap 122 could be mounted independently of the lower end of the belt 112 if preferred. The strap 122 can be a continuation of the belt 112, a suitable snubber device being then provided at the anchorage 116, in accordance with the teachings of the aforesaid U.S. Pat. No. 4,243,266.

It will be noted also that the arrangement of FIG. 5 can be employed with a seat belt system incorporating a retractor by use of the double loop arrangements of FIG. 6 or 7. Thus with a retractor mounted as shown in FIG. 6, a double loop bracket such as the bracket 114 would be provided at the anchorage 97 for securement of the upper end of the strap 92 and to provide a running loop for the belt. Where appropriate, the double swivel bracket arrangement of FIG. 7 could be employed at the anchorage 97 instead.

The invention thus provides shoulder height adjustment devices as described suitable for addition to vehicles with existing seat belt systems and for incorporation as original equipment or inclusion in seat belt systems to be fitted either to new or to existing vehicles. The seat belt system in or with which an adjustment device of the invention is employed can be of any kind having a diagonal or shoulder belt or belt portion, whether or not associated with a lap or pelvis belt or belt portion.

It will be evident that the embodiments specifically described herein may be modified by those skilled in the art on the basis of the present disclosure without departing from the present inventive concepts. The present invention is thus to be regarded as embracing each and every novel feature and combination of novel features herein disclosed and as limited solely by the spirit and scope of the appended claims.

I claim:

1. A safety belt system for restraining an occupant in a vehicle seat having a back portion, the system comprising restraining belt means, said belt means extending in use diagonally across the front of the occupant from an upper first position above the occupant's shoulder at one side of the seat to a second lower position at the other side of the seat, adjustment means including a flexible strap carried by said seat back portion, and connector means slidable along and about said flexible strap and connectible with said belt means at a position thereon between said first position and said shoulder, and means independent of said strap for anchoring both ends of said belt means, whereby said adjustment means serves only to position an intermediate portion of said belt means.

2. The safety belt system of claim 1 wherein said flexible strap extends around said seat back portion in a closed loop so as to be secured to said seat back portion, with a portion of said strap extending generally upright on the front of said seat back portion.

3. The safety belt system of claim 2, and a rigid bracket, the bracket being received between the seat and back portions of said seat and having the ends of said strap connected thereto.

4. The safety belt system of claim 2 further comprising means for selectively adjusting the length of said strap.

5. The safety belt system of claim 2 wherein said connector means is adapted to be slidable along said strap to a selected position therealong.

6. A vehicle comprising a cabin, a seat within said cabin, and a safety belt system for restraining an occupant in said seat, said system comprising restraining belt means, said belt means extending in use diagonally across the front of the occupant from an upper first position above the occupant's shoulder at one side of the seat to a second lower position at the other side of the seat, adjustment means including a generally upright flexible strap secured at its upper and lower ends to said cabin adjacent said one side of said seat so as to be independent of said belt means, and connector means carried by said strap for movement to a selected position therealong, said connector means being adapted for connection with said belt means at a position thereon between said first position and said shoulder, and means independent of said strap for anchoring both ends of said belt means, whereby said adjustment means serves only to position an intermediate portion of said belt means.

7. The vehicle of claim 6 further comprising a door and a door pillar adjacent said seat, and a retractor for said belt means located at the foot of said door pillar.

8. The vehicle of claim 6 wherein said connector means is manually slidable along said strap to a selected position therealong.

9. The vehicle of claim 6 wherein said strap is selectively connectible to said belt means.

10. A vehicle comprising a seat having a back portion, and a safety belt system for restraining an occupant in the seat, the system comprising
   belt retractor means,
   belt means withdrawable from said belt retractor means,
   belt guide means at a fixed position in said vehicle above said occupant's shoulder at one side of said seat and having said belt means guided therethrough, belt securement means below said seat back portion and at the other side of said seat,
   whereby said belt means extends in use from said retractor means through said guide means and generally diagonally downwardly across the front of the occupant to said belt securement means,
   an elongate member extending from said belt guide means downwardly over the front of said seat back portion to a mounting position, and
   connector means carried by said elongate member for connection to said belt means at a position thereon between said belt guide means and said shoulder.

11. The vehicle of claim 10 wherein said connector means is slidably received on said elongate means for movement therealong to a selected position.

12. The vehicle of claim 10 wherein said connector means is selectively connectible to said belt means.

13. The vehicle of claim 10 wherein said guide means comprises bracket means having a first loop to receive said belt means freely therethrough and a second loop for securement thereto of the upper end of said elongate member.

14. The vehicle of claim 9 wherein said bracket means comprises a first bracket providing said first loop and fastened to said vehicle for swivelling movement about an axis, and a second bracket providing said second loop and fastened to said vehicle for swivelling movement about said axis independently of said first bracket.

15. The vehicle of claim 9 further comprising a bracket at the lower end of said elongate means connecting said elongate means to said vehicle at the location of said belt securement means.

* * * * *